(12) United States Patent
Pirner

(10) Patent No.: US 12,055,260 B2
(45) Date of Patent: *Aug. 6, 2024

(54) SPEED CONTROL DEVICES FOR A SMART PIPELINE INSPECTION GAUGE

(71) Applicant: Entegra LLP

(72) Inventor: Paul Pirner, Mississauga (CA)

(73) Assignee: Entegra LLP, Indianapolis, IN (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/472,565

(22) Filed: Sep. 10, 2021

(65) Prior Publication Data

US 2021/0404592 A1    Dec. 30, 2021

Related U.S. Application Data

(63) Continuation of application No. 16/129,176, filed on Sep. 12, 2018, now Pat. No. 11,118,718.

(Continued)

(51) Int. Cl.
*F16L 55/30* (2006.01)
*B60L 7/18* (2006.01)
(Continued)

(52) U.S. Cl.
CPC ............. *F16L 55/30* (2013.01); *B60L 7/18* (2013.01); *B60L 15/2009* (2013.01);
(Continued)

(58) Field of Classification Search
CPC . F16L 55/26; F16L 55/30; F16L 55/32; F16L 55/34; F16L 55/36; F16L 55/38;
(Continued)

(56) References Cited

U.S. PATENT DOCUMENTS 3,056,155 A * 10/1962 Harmes ............... B08B 9/0553
118/DIG. 10
4,011,100 A * 3/1977 Ross ................... B08B 9/047
134/8

(Continued)

FOREIGN PATENT DOCUMENTS

WO    2010002871 A1    1/2010

OTHER PUBLICATIONS

International Search Report and Written Opinion in related case PCT/US2018/050723, dated Jan. 30, 2019.
(Continued)

*Primary Examiner* — Robert J Scruggs
(74) *Attorney, Agent, or Firm* — Maginot, Moore & Beck, LLP

(57) ABSTRACT

A speed control apparatus for an inline pipeline inspection tool includes a body configured to be moved by a compressible product moving through a pipeline and a speed control mechanism supported by the body. The speed control mechanism includes a contact member that is positionable against an inner surface of the pipeline and an actuator configured to act on the contact member to adjust a speed of the body when the speed deviates from a predetermined speed. The speed control apparatus forms a drive system that provides forward propulsion to prevent the tool from slowing or stopping due to a problematic feature in the pipeline. The speed control apparatus also forms a brake system that minimizes overspeed conditions that can occur when built-up pressure initially dislodges the tool from the problematic feature in the pipeline.

14 Claims, 5 Drawing Sheets

Related U.S. Application Data

(60) Provisional application No. 62/557,986, filed on Sep. 13, 2017.

(51) Int. Cl.
 *B60L 15/20* (2006.01)
 *F16L 55/38* (2006.01)
 *B60T 1/12* (2006.01)

(52) U.S. Cl.
 CPC ........... *F16L 55/38* (2013.01); *B60L 2240/12* (2013.01); *B60L 2240/463* (2013.01); *B60T 1/12* (2013.01)

(58) Field of Classification Search
 CPC .. F16L 55/46; F16L 55/48; B60L 7/18; B60L 15/2009; B60L 2240/12; B60L 2240/463; B60T 1/12; B08B 9/0553; B08B 9/0557; B08B 9/0552; F28G 1/12
 See application file for complete search history.

(56) References Cited

U.S. PATENT DOCUMENTS

| | | | | |
|---|---|---|---|---|
| 4,027,349 A | * | 6/1977 | Clavin | B08B 9/049 15/88 |
| 4,852,391 A | | 8/1989 | Ruch et al. | |
| 4,938,167 A | * | 7/1990 | Mizuho | F16L 55/28 118/317 |
| 5,293,905 A | * | 3/1994 | Friedrich | F16L 55/1283 166/135 |
| 6,190,090 B1 | | 2/2001 | Campbell et al. | |
| 6,232,773 B1 | | 5/2001 | Jacobs et al. | |
| 6,450,104 B1 | * | 9/2002 | Grant | B08B 9/049 104/138.1 |
| 8,281,444 B2 | | 10/2012 | Rosen et al. | |
| 11,118,718 B2 | * | 9/2021 | Pirner | F16L 55/32 |
| 2006/0170386 A1 | * | 8/2006 | Anhalt | B25J 9/065 318/568.12 |
| 2009/0293622 A1 | | 12/2009 | Rosen | |
| 2010/0305875 A1 | | 12/2010 | Williams et al. | |
| 2011/0138555 A1 | | 6/2011 | Freeman et al. | |
| 2015/0152992 A1 | * | 6/2015 | Choi | F16H 48/11 475/248 |
| 2016/0136700 A1 | | 5/2016 | Schaller et al. | |
| 2016/0167094 A1 | | 6/2016 | Danilov et al. | |
| 2016/0238184 A1 | | 8/2016 | Fielers et al. | |

OTHER PUBLICATIONS

Extended European Search Report corresponding to European Patent Application No. 18856227.6, dated Apr. 30, 2021 (11 pages).

\* cited by examiner

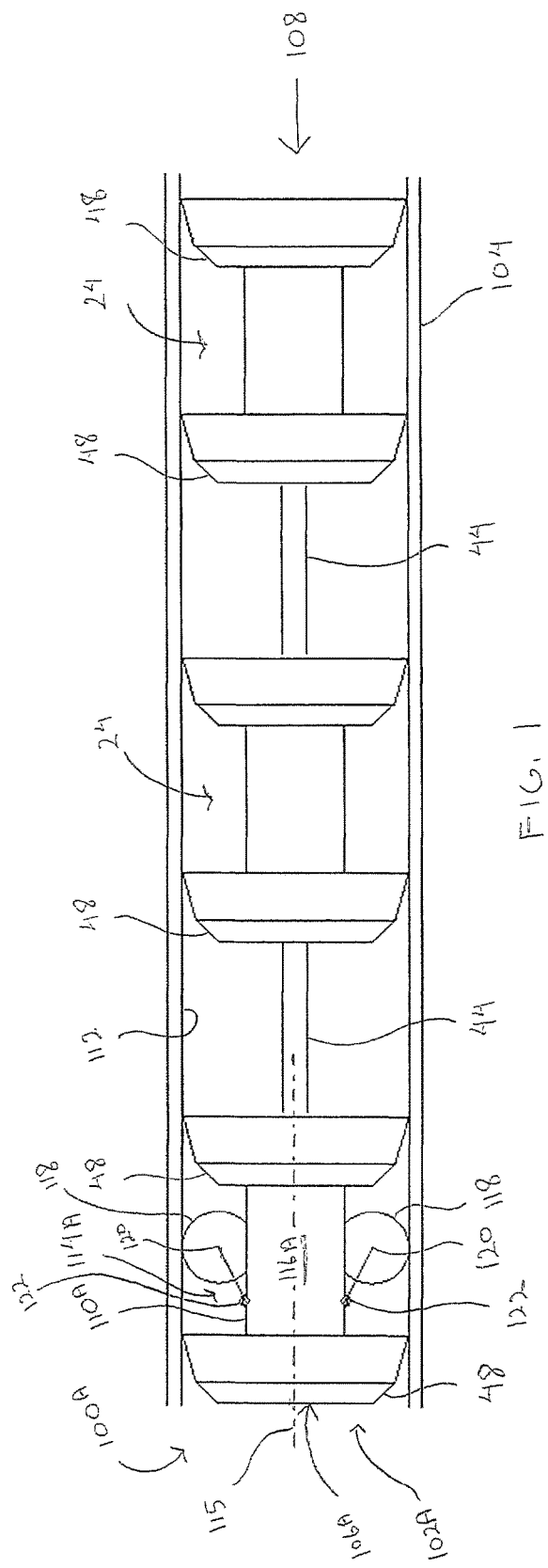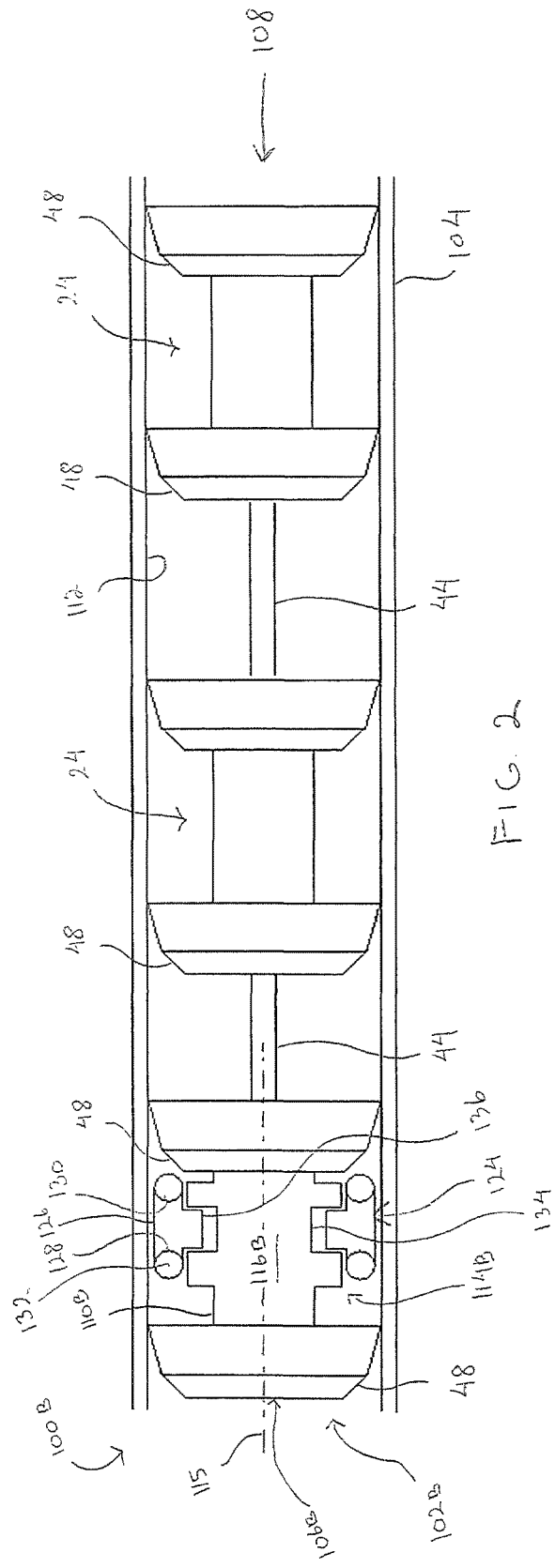

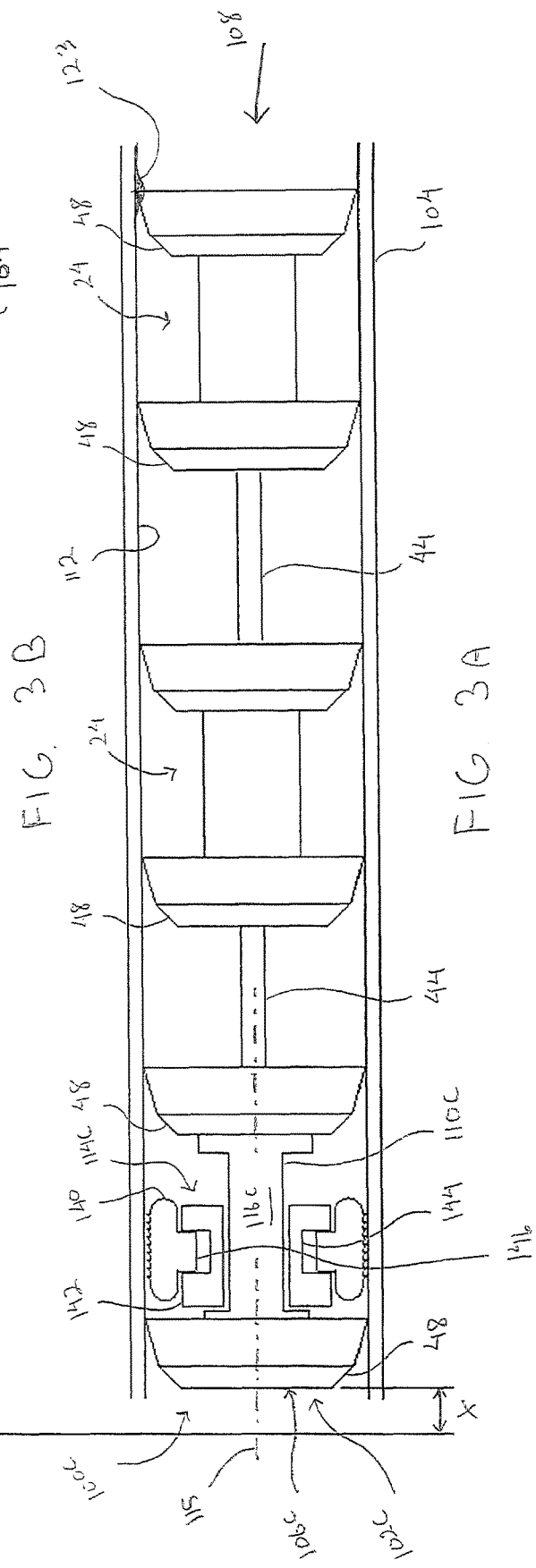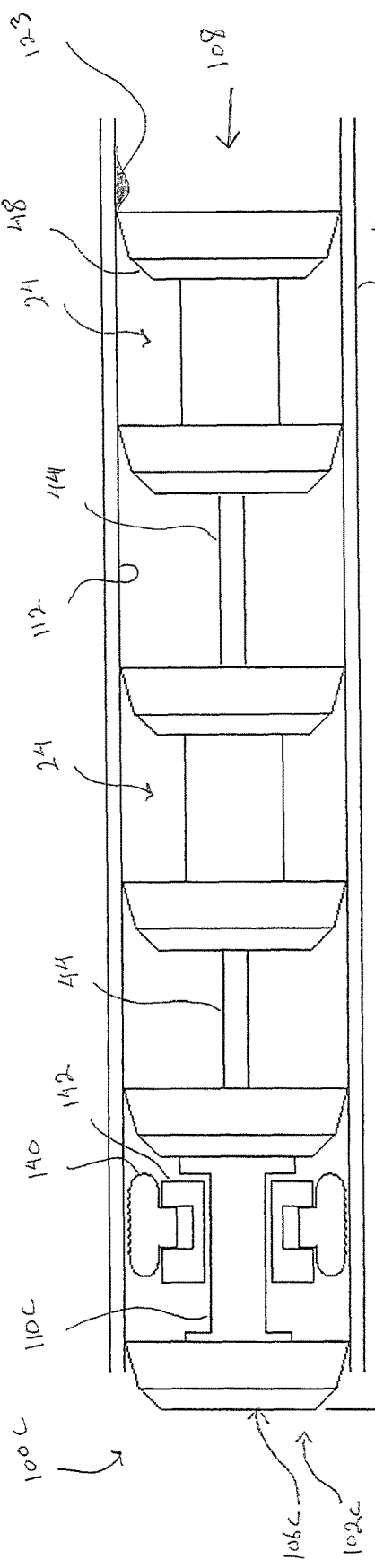

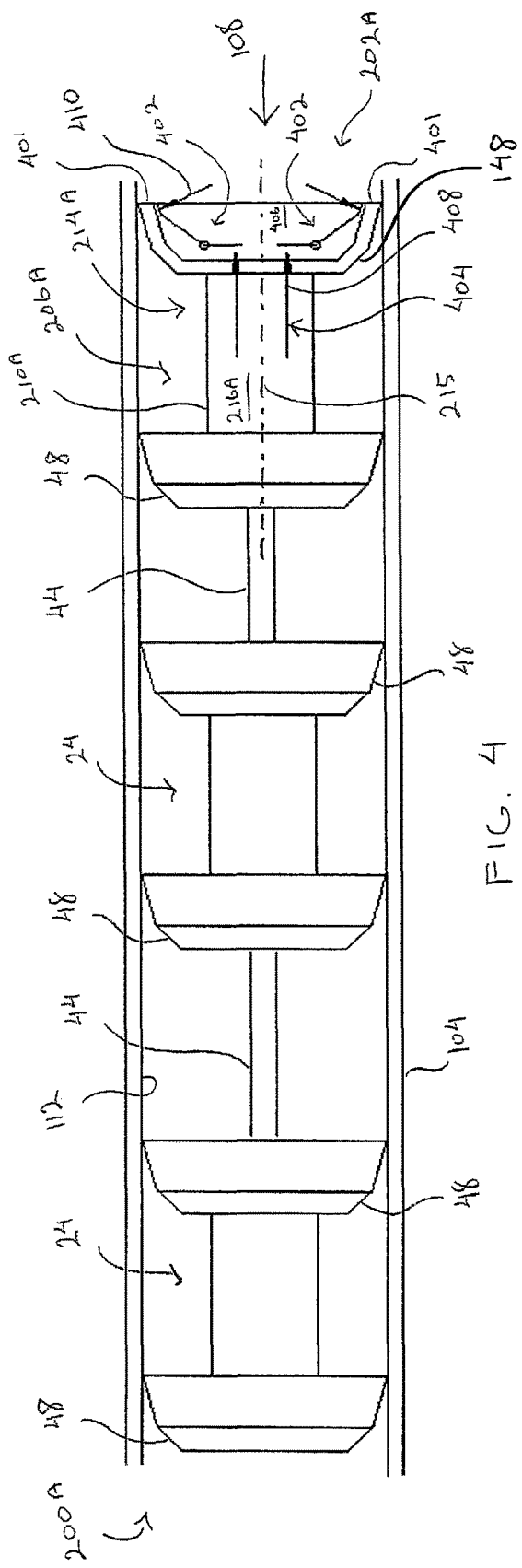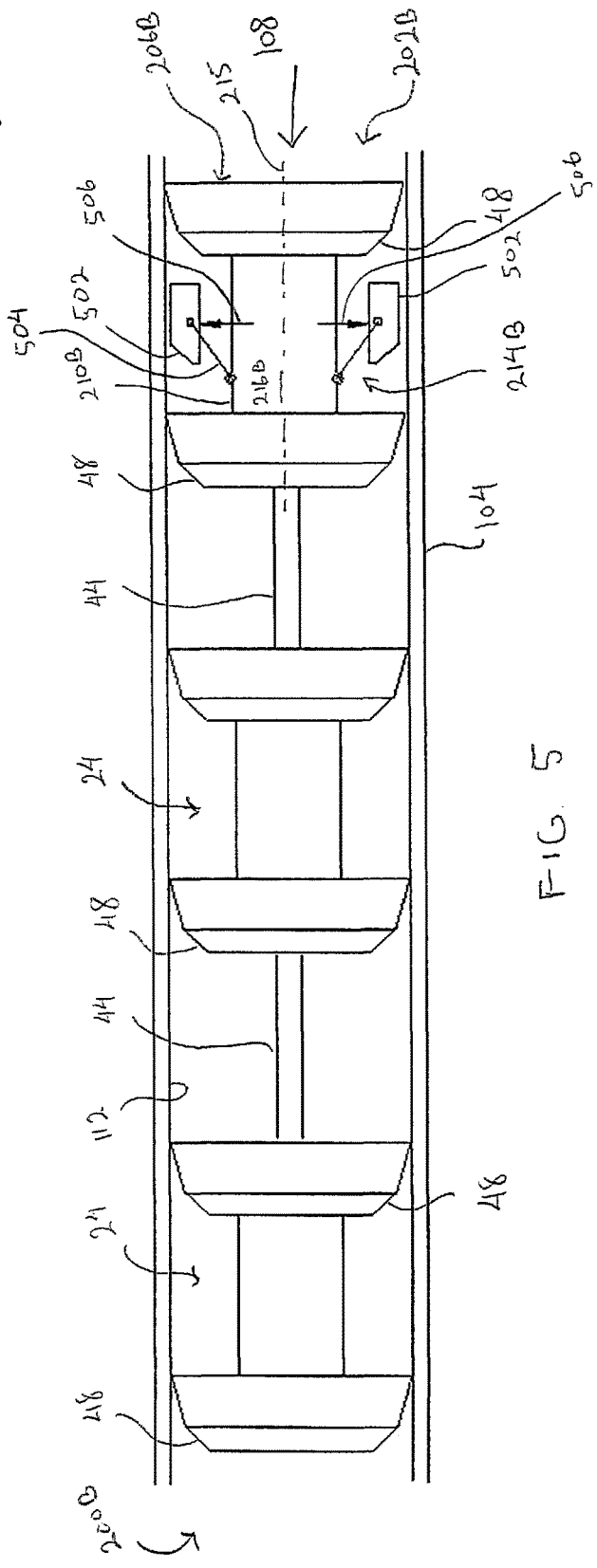

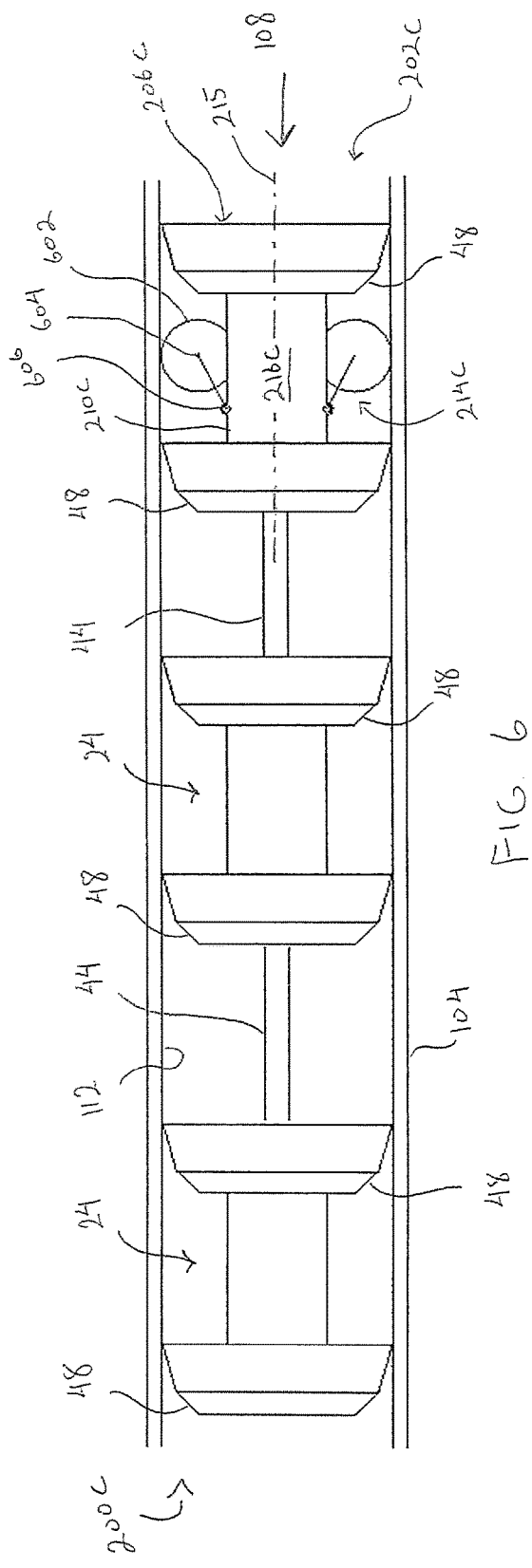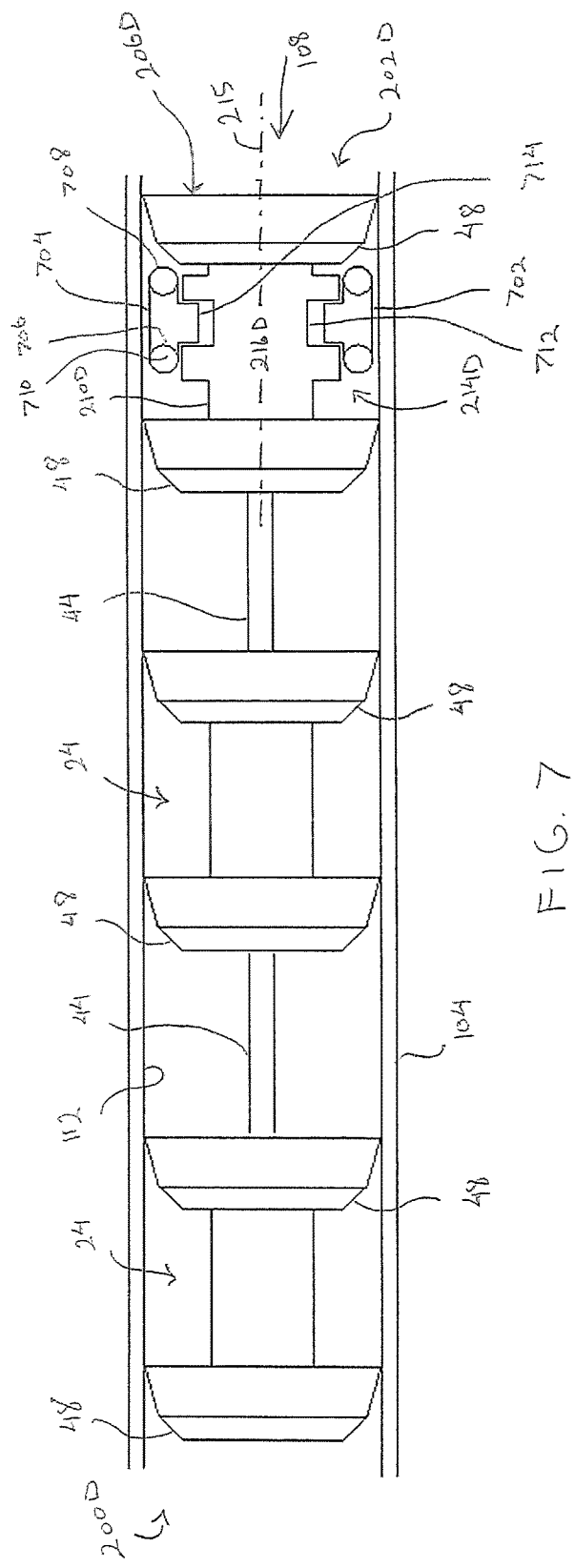

SPEED CONTROL DEVICES FOR A SMART PIPELINE INSPECTION GAUGE

CROSS-REFERENCE TO RELATED APPLICATIONS

This application is a continuation of U.S. patent application Ser. No. 16/129,176, filed Sep. 12, 2018, now U.S. Pat. No. 11,118,718, which claims the benefit of U.S. Provisional Patent Application No. 62/557,986, filed Sep. 13, 2017, the entire contents of which are incorporated herein by reference.

FIELD

This application relates to the field of pipeline inspection tools, and particularly to controlling the speed of smart pipeline inspection gauges that are propelled by compressible products moving through the pipelines.

BACKGROUND

Pipeline systems are an integral component of global energy distribution. There are more than 2.6 million miles of energy pipelines in the United States alone, delivering trillions of cubic feet of natural gas and hundreds of billions of ton/miles of liquid petroleum products each year. To ensure the safety of these vast pipeline systems and often to comply with governmental regulations, pipeline operators must frequently service their pipelines and perform periodic inspections to assess pipeline integrity. Mechanical devices referred to as pipeline inspection gauges (or "pigs") are often employed to perform these maintenance and inspection functions inside the pipeline.

There are generally two types of pigs used to perform in-line maintenance operations: cleaning pigs and instrumented or smart pigs. Cleaning pigs are often purely mechanical devices that clean or maintain the inside of the pipeline by performing various maintenance functions such as brushing, scraping, or polishing along the inside wall surfaces to remove debris as the pigs are pushed through the pipeline by the pressure of the product in the pipeline. Smart pigs are instrumented, electromechanical devices often referred to as inline inspection (ILI) tools that are used to inspect the pipeline for corrosion, metal loss, deformations, the position of the pipeline, and various other parameters as needed. Smart pigs are also typically propelled through the pipeline by the pressure of the product in the pipeline. Pigs that are propelled by the pressure of the product flowing through the pipeline are also referred to as "free-swimming" pigs.

The different types of smart pigs are characterized by the different types of technologies implemented to perform their inspection functions. Some examples of smart pigs include ultrasonic transducing (UT) pigs that use sound waves to measure the thickness of the wall of a steel pipe, curvature detection pigs that employ inertial navigation technology to measure the position and shape of the pipe, and magnetic flux leakage (MFL) detection pigs that use powerful magnets to saturate the pipe wall with magnetism and then carry out a corrosion measurement or defect characterization function.

With reference to FIG. 8, an ILI tool 20 typically includes a plurality of packages or sections 24 that carry out specific functions. For instance, the tool 20 can include a first sensor section 28 for measuring a first parameter, a second sensor section 32 for measuring a second parameter, a navigational section 36 for determining relative or global position, and a power section 40 for powering any on-board electronics. The sections 24 are tethered to one another via flexible joints or tow links 44 that allow the respective sections 24 to pass individually through bends (not shown) in the pipeline 104 (FIGS. 1-7). An ILI tool 20 can include one to ten or more sections 24 depending on the application though most tools include two to six sections 24. For purposes of this background discussion, the sections 24 are illustrated in FIG. 8 as structurally identical. In practice, the sections 24 typically have unique structures and/or are equipped with specialized equipment or sensors in order to carry out their particular functions. The sections 24 may include one or more annular disks or cups 48 that are sized to contact the inner surface of the pipeline in order to center the ILI tool 20 in the pipeline. The disks or cups 48 typically have a solid or flexible structure formed from a polymer material such as polyurethane (PU).

One issue that arises in relying on the pressure of the product in the pipeline to propel the ILI tool therethrough is that the speed of the tool in compressible product pipelines may vary as the tool encounters certain features along the inner surface of the pipeline. For instance, in low pressure, low flow gas pipelines, the forward motion of the ILI tool may stop and restart repeatedly along its travel path if the tool encounters a problematic feature such as heavy welds, debris or product build up, or other geometric changes in the pipeline such as tight bends. The ILI tool may be even more susceptible to repeated stops and starts when traveling through small diameter gas pipelines with low pressure and low flow conditions. As used herein, a "problematic feature" refers to any surface condition of a pipeline that causes the speed of a free swimming ILI tool to fluctuate above and/or below a target or predetermined inspection speed or predetermined range of inspection speeds.

Upon reaching such a problematic feature in a compressible product pipeline, the ILI tool experiences rapid deceleration until it substantially slows or completely stops in the pipeline. Then, pressure builds up behind the ILI tool until the pressure is sufficient to dislodge the tool from the encountered feature. The ILI tool then experiences rapid acceleration and unacceptable speed excursions until the pressure begins to equalize and the speed of the tool stabilizes. Speed variation may be problematic because the data acquisition devices of most ILI tools are designed to acquire data at predetermined speeds relative to the inspected features. Periods of rapid acceleration or deceleration or of speeds above or below the predetermined level may reduce the accuracy of the data acquired by the ILI tool during these periods.

As used herein, "predetermined inspection speed," "predetermined range of inspection speeds," or the like refer to a speed or a range of speeds of the ILI tool in which essentially all the inspection data collected while moving at the indicated speed or the indicated range of speeds is not rendered inaccurate or unusable because of the speed of the ILI. In other words, if data collected by the ILI tool while moving at the "predetermined inspection speed," the "predetermined range of inspection speeds," or the like is determined to be inaccurate or unusable, the speed of the ILI tool is not the reason for the data to be inaccurate or unusable.

One solution in the prior art to address the issue with speed variation is to provide the ILI tool with a gas bypass speed control system. The gas bypass speed control system includes at least one section configured as a speed control unit that provides a controlled bypass of the product through the pig via an active valve system. The speed control units are sized and structured to operate in different pipeline sizes. Gas-bypass tools are typically used for inspection of long sections of pipeline where the product flow rate under normal operating conditions would propel the ILI tool faster than its predetermined inspection speed. The gas-bypass tool provides a controlled bypass of the product so that the speed of the tool can be reduced to the predetermined speed even when the pipeline is operated at regular volume.

The problem with using gas-bypass systems for speed control is that the speed control allows bypass of product only when the tool goes too fast. When the tool goes at normal speed, the bypass may be partially opened or closed entirely. Assuming the tool encounters a weld or some other obstacle and stops within the pipeline, the bypass is completely closed because the tool is not moving and there is no reason for the tool to open the bypass and let any gas through. While the tool is stopped, significant energy is building behind the tool until the tool is forced past the obstacle at which time the tool experience substantial acceleration and exceeds its speed target. During this over-speed condition, even when the bypass is opened completely, there is still not enough bypass to let all of the energy through so the tool will still accelerate past the designed speed. Thus, while such gas bypass speed control systems may provide some form of regulation when the tool experiences an over-speed condition, gas bypass systems are not adequate to prevent the over-speed condition from occurring in the first place.

What is needed, therefore, is an ILI tool with one or more sections configured to overcome the foregoing problems when the tool encounters features along the pipeline inner surface that cause the tool speed to deviate from its target speed.

SUMMARY

A speed control section for an inline pipeline inspection tool in one embodiment includes a body configured to be moved by a compressible product moving through a pipeline, and a speed control mechanism supported by the body, the speed control mechanism including a contact member configured to be positioned against an inner surface of the pipeline and a first actuator configured to act on the contact member to adjust a speed of the body when the speed of the body deviates from a predetermined range of speeds. The speed control apparatus in this embodiment forms a speed control system that provides forward propulsion of the tool to prevent the tool from slowing or stopping due to a problematic feature in the pipeline and additionally minimizes overspeed conditions that can occur when built-up pressure initially dislodges the tool from the problematic feature in the pipeline that causes the tool to stop.

A drive section for an inline inspection tool in one embodiment includes a body that extends in an axial direction, and a drive mechanism supported by the body, the drive mechanism including at least one drive member positionable in a first position relative to the body such that the drive member contacts an inner surface of the pipeline, and a first actuator configured to a cause a movement of the drive member relative to the body in response to a sensed condition of the drive section, the movement of the drive member when the drive member is positioned in the first position is configured to cause the drive section to move axially forward relative to the pipeline. The drive section in this embodiment forms a tractor drive system that provides one or more of constant or on demand forward propulsion of the tool in order to prevent the tool from slowing or stopping due to the problematic feature in the pipeline.

A drive section for an inline inspection tool in another embodiment includes a body configured to be moved by a compressible product moving through a pipeline in a flow direction, and a drive mechanism supported by the body, the drive mechanism including a clamp member configured to be clamped against an inner surface of the pipeline and a guide member configured to be moved axially relative to the body while supporting the clamp member, the drive mechanism is configured execute a movement sequence with the clamp member and the guide member to move the body past the problematic feature that causes the body to stop unexpectedly in the pipeline.

A brake section for an in-line inspection tool in one embodiment includes a body that extends in an axial direction, and a brake mechanism supported by the body, the brake mechanism including at least one brake member positionable in a first position relative to the body such that the brake member contacts an inner surface of the pipeline, and a first actuator configured to change a braking characteristic of the brake member on inner surface in response to a sensed condition of the brake section, the changed braking characteristic when the brake member is positioned in the first position is configured to cause a change in a speed of the brake section relative to the pipeline. The brake section in this embodiment forms an active brake system that actively increases or decreases the drag of the tool along the pipeline surface in order to minimize or eliminate an over-speed condition that occurs when built-up pressure initially dislodges the tool from the problematic feature in the pipeline that causes the tool to stop.

A brake section for an inline inspection tool in another embodiment includes a body configured to be moved by a compressible product moving through a pipeline in a flow direction, and a brake mechanism supported by the body, the brake mechanism including a friction element configured to be positioned against an inner surface of the pipeline and an actuator configured to act on the friction element to decrease a speed of the body during an overspeed condition in which the speed of the body in the flow direction is above a predetermined range of speeds.

BRIEF DESCRIPTION OF THE DRAWINGS

FIG. 1 shows a cutaway view of a pipeline with an ILI tool positioned therein with a side view of two sections of the ILI tool tethered at a foremost end to a first embodiment of a tractor section for facilitating forward movement of the tool through the pipeline;

FIG. 2 shows a side view of the two sections of the ILI tool of FIG. 1 tethered at the foremost end to a second embodiment of a tractor section for facilitating forward movement of the tool through the pipeline;

FIG. 3A shows a side view of the two sections of the ILI tool of FIG. 1 tethered at the foremost end to a third embodiment of a tractor section for facilitating forward movement of the tool through the pipeline with an actuator of the tractor section positioned in a first position;

FIG. 3B shows the ILI tool of FIG. 3A with the actuator of the tractor section positioned in a second position and the ILI tool moved incrementally forward in the pipeline;

FIG. 4 shows a side view of the two sections of the ILI tool of FIG. 1 tethered at a rearmost end to a first embodiment of a brake section for controlling the speed of the tool through the pipeline;

FIG. 5 shows a side view of the two sections of the ILI tool of FIG. 1 tethered at the rearmost end to a second embodiment of a brake section for controlling the speed of the tool through the pipeline;

FIG. 6 shows a side view of the two sections of the ILI tool of FIG. 1 tethered at the rearmost end to a third embodiment of a brake section for controlling the speed of the tool through the pipeline;

FIG. 7 shows a side view of two sections of the ILI tool of FIG. 1 tethered at the rearmost end to a fourth embodiment of a brake section for controlling the speed of the tool through the pipeline.

DETAILED DESCRIPTION

Tractor Drive System

Figure 8:
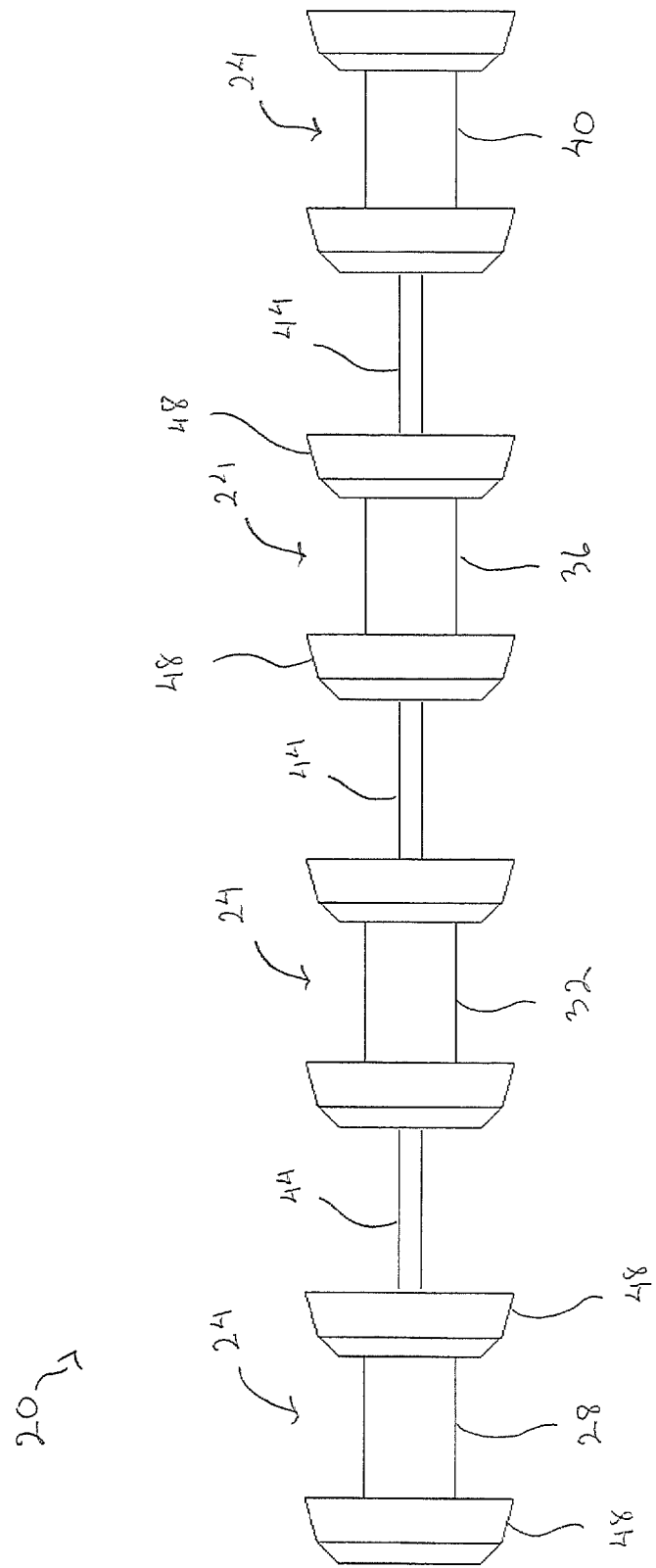
FIG. 8 shows a side view of a prior art inline inspection (ILI) tool with a plurality of sections tethered together for assessing the condition of a pipeline.

FIGS. 1-3B depict an ILI tool 100A-C with a tractor drive system 102A-C for facilitating forward movement of the tool 100A-C through a pipeline 104. The tractor drive system 102A-C is described herein with reference to three different embodiments although more embodiments are possible. Features of the tractor drive that are essentially identical among the different embodiments are identified with the same reference number. Features that are similar among the different embodiments, but have different structural characteristics or other attributes, are denoted with the same reference number followed by a capital letter (i.e., 102A, 102B, 102C, etc.). Features that are unique to each embodiment are identified with a unique reference number.

Wheel Drive System

FIG. 1 shows a first embodiment of the tractor drive system 102A in the form of a "wheel" drive system. The tractor drive system 102A includes a drive section 106A arranged at one end of the ILI tool 100A. The drive section 106A includes a central body portion 110A, two annular disks or cups 48, and a drive mechanism 114A. In some embodiments, a suspension mechanism (not shown) configured to suspend the drive section 106A within the pipeline 104 is provided in addition to or instead of the cups 48. The drive section 106A in the embodiment shown is arranged at a foremost end of ILI tool 100A relative to the product flow direction as indicated by arrow 108. In other embodiments, the drive section 106A can be arranged at a rearmost end of the ILI tool 100A or intermediate the foremost and rearmost ends of the tool 100A. In still further embodiments, the tool 100A includes multiple drive sections 106A arranged at any position along the tool 100A. The drive section 106A and other sections 24 are tethered one behind the other via flexible joints or tow links 44 that allow the respective sections 24, 106A to pass individually through bends (not shown) in the pipeline 104.

The central body portion 110A of the drive section 106A is configured to support various electronics and mechanical members that facilitate forward movement of the ILI tool 100A. The body portion 110A defines a central axis 115 of the drive section 106A and extends axially along the central axis 115. The body portion 110A has an outer surface 116A that encircles the central axis 115 in some embodiments defines features that cooperate with the various electronics and mechanical members of the ILI tool 100A.

The two annular disks or cups 48 of the drive section 106A are sized to contact the inner surface 112 of the pipeline 104 and align the central axis 115 of the drive section 106A with a central axis (not shown) of the pipeline 104. The cups 48 are arranged at opposite axial ends of the body portion 110A in spaced relation to one another. The cups 48 have a solid or flexible structure formed from a polymer material such as polyurethane (PU). In other embodiments, the drive section 106A can have more or less than two cups 48 arranged at any position on the body portion 110A. In yet further embodiments, the drive section 106A has no cups 48 and alignment is facilitated by one or more of the drive mechanism 114A and other sections 24 of the ILI tool 100A.

The drive mechanism 114A of the drive section 106A is supported by the body portion 110A. The drive mechanism 114A includes at least one wheel 118, a first actuator 120, and a second actuator 122. The wheel 118 is positionable against the inner surface 112 of the pipeline 104. The wheel 118 has a wheel axis (not shown) that is oriented substantially perpendicular to the central axis 115 of the drive section 106A such that rotation of the wheel 118 when positioned against the inner surface 112 of the pipeline 104 causes axial movement of the ILI tool 100A relative to the pipeline 104.

The first actuator 120 is configured to rotate the wheel 118 in a first rotational direction that causes forward movement of the ILI tool 100A relative to the pipeline 104 in the product flow direction 108 when the wheel 118 is positioned against the inner surface 112 of the pipeline 104. The actuator can be, for example, an electric motor having an output shaft with the wheel 118 connected to the output shaft. The electric motor in this embodiment generates a torque on the wheel 118 via the output shaft. In other embodiments, the first actuator 120 is further configured to rotate the wheel 118 in a second direction opposite the first direction in a manner that causes rearward movement of the ILI tool 100A relative to the pipeline 104 opposite the product flow direction 108 when the wheel 118 is positioned against the inner surface 112 of the pipeline 104.

The drive mechanism 114A further includes a second actuator 122 configured to change a radial position of the wheel 118 relative to the body portion 110A. The second actuator 122 positions the wheel 118 between a first position in which the wheel 118 is spaced from the inner surface 112 of the pipeline 104 and a second position in which the wheel 118 is in contact with the inner surface 112 of the pipeline 104. In the embodiment shown, the second actuator 122 has an elongate body that is connected at one end to a pivot (not shown) on the body portion 110A and at the other end to the wheel 118. The second actuator 122 in this embodiment moves the wheel 118 along an arcuate path between the first and second positions by rotation about the pivot on the body portion 110A. In other embodiments, the second actuator 122 moves radially inwardly and outwardly along a linear path relative to the body portion 110A in order to position the wheel 118 in the first and second positions. In some embodiments, the body portion 110A defines a groove or depression (not shown) into which the wheel 118 is partially or fully recessed in one or more of the first position and the second position. The groove may provide clearance for the wheel 118 when the wheel 118 is in the first position and when the first actuator 120 rotates the wheel 118.

The drive mechanism 114A in some embodiments may include one or more sensors (not shown) configured to measure the force at which the wheel 118 is held in contact against inner surface 112 so as to ensure the wheel 118 does not slip relative to the inner surface 112 when rotated by the first actuator 120. The drive mechanism 114A in some embodiments employs one or more biasing elements (not shown) in place of the second actuator 122 so as to continuously bias the wheel 118 in a radially outward direction towards the inner surface 112 of the pipeline 104.

The drive mechanism 114A in the embodiment shown has two wheels 118 each with a respective first actuator 120 and a respective second actuator 122. In other embodiments, the drive mechanism 114A has more or less than two wheels 118, two first actuators 120, and two second actuators 122. In yet further embodiments, all of the wheels 118 are rotated and positioned by any number of the first actuators 120 and the second actuators 122. The wheels 118 and the first actuators 120 are generally spaced equally from one another about the body portion 110A such that a reaction force on the body portion 110A from the force of the wheels 118 against the inner surface 112 of the pipeline does not misalign the ILI tool 100A relative to the centerline of the pipeline 104.

Track Drive System

FIG. 2 shows a second embodiment of the tractor drive system 102B in the form of a "track" drive system. The tractor drive system 102B includes a drive section 106B arranged at one end of the ILI tool 100B. The drive section 106B includes a central body portion 110B, two annular disks or cups 48, and a drive mechanism 114B. In some embodiments, a suspension mechanism (not shown) configured to suspend the drive section 106B within the pipeline 104 is provided in addition to or instead of the cups 48. The drive section 106B in the embodiment shown is arranged at a foremost end of ILI tool 100B relative to the product flow direction as indicated by arrow 108. In other embodiments, the drive section 106B can be arranged at a rearmost end of the ILI tool 100B or intermediate the foremost and rearmost ends of the tool 100B. In still further embodiments, the tool 100B includes multiple drive sections 106B arranged at any position along the tool 100B. The drive section 106B and other sections 24 are tethered one behind the other via the tow links 44 that allow the respective sections 24, 106B to pass individually through bends (not shown) in the pipeline 104.

The central body portion 110B of the drive section 106B is configured to support various electronics and mechanical members that facilitate forward movement of the ILI tool 100B. The body portion 110B defines a central axis 115 of the drive section 106B and extends axially along the central axis 115. The body portion 110B has an outer surface 116B that encircles the central axis 115. The outer surface 116B in some embodiments defines features that cooperate with the various electronics and mechanical members of the ILI tool 100B.

The two annular disks or cups 48 of the drive section 106B are arranged at opposite axial ends of the body portion 110B in spaced relation to one another. The cups 48 are sized to contact the inner surface 112 of the pipeline 104 and align the central axis 115 of the drive section 106B with the central axis of the pipeline 104. The cups 48 have a solid or flexible structure formed from a polymer material such as polyurethane (PU).

The drive mechanism 114B of the drive section 106B is supported by the body portion 110B. The drive mechanism 114B includes at least one track mechanism 124, a first actuator 132, and a second actuator. The track mechanism 124 includes a track 126, at least one drive wheel 128, and at least one guide wheel 130. The track 126 is positionable against the inner surface 112 of the pipeline 104. The guide wheel 130 is spaced axially from the drive wheel 128. The track 126 cooperates with the drive wheel 128 and the guide wheel 130 to orient the track 126 substantially parallel to the inner surface 112 of the pipeline 104 along the portion of the track 126 that is positionable against the inner surface 112.

The first actuator 132 of the drive mechanism 114B is configured to rotate the drive wheel 128. The drive wheel 128 cooperates with the track 126 to move the track 126 when the drive wheel 128 is rotated by the first actuator 132. The drive wheel 128 and the guide wheel 130 each have a wheel axis (not shown) that is oriented substantially perpendicular to the central axis 115 of the drive section 106B such that movement of the track 126 when positioned against the inner surface 112 of the pipeline 104 causes axial movement of the ILI tool 100B relative to the pipeline 104. The first actuator 132 is configured to rotate the drive wheel 128 in a first rotational direction that causes movement of the track 126 in a first track direction, which in turn causes forward movement of the ILI tool 100B relative to the pipeline 104 in the product flow direction 108. The first actuator 132 in one embodiment is a rotary electric machine with an output shaft configured to generate a torque on the drive wheel 128 so as to rotate the drive wheel 128 and move the track 126. In other embodiments, the first actuator 132 is further configured to rotate the drive wheel 128 in a second direction opposite the first direction in a manner that causes movement of the track 126 in a second track direction opposite the first track direction which in turn cause rearward movement of the ILI tool 100B relative to the pipeline 104 opposite the product flow direction 108. In some embodiments, the track mechanism 124 includes a second drive wheel (not shown) in addition to or in place of the guide wheel 130 such that the track mechanism has at least two drive wheels. The second drive wheel can be rotated by the first actuator 132 or by a further actuator that is configured to rotate the second drive wheel in the same manner as the first actuator 132.

The second actuator of the drive mechanism 114B is configured to change a radial position of the track mechanism 124 relative to the body portion 110B. The second actuator positions the track mechanism 124 between a first position in which the track 126 is spaced from the inner surface 112 of the pipeline 104 and a second position in which the track 126 is in contact with the inner surface 112 of the pipeline 104. The second actuator includes any mechanism that changes the radial position of the track mechanism 124 such as a linkage, chain, gear, screw, or the like. In the embodiment shown, the body portion 110B defines a groove 134 that is configured to accept a corresponding protrusion 136 on the track mechanism 124 in order to guide the track mechanism 124 between the first and second positions. The groove 134 and the protrusion 136 each have corresponding planar support faces that are oriented perpendicular to the central axis 115 of the drive section 106B. The support faces enable the protrusion 136 to transfer an axial force from the track mechanism 124 to the groove 134 of the body portion 110B when the track mechanism 124 is in the second position and the track is moved in the first or second track directions. In other embodiments, the track mechanism 124 is supported by an arm or a parallelogram arm system that guides the track mechanism 124 between the first and second positions.

The drive mechanism 114B in the embodiment shown has two track mechanisms 124 each with a respective first actuator 132 and a respective second actuator. In other embodiments, the drive mechanism 114B has more or less than two track mechanisms 124, two first actuators 132, and two second actuators. In yet further embodiments, all of the tracks 126 are moved and positioned by any number of the first actuators 132 and the second actuators. The track mechanisms 124 are generally spaced equally from one another about the body portion 110B such that a reaction force on the body portion 110B from the force of the tracks 126 against the inner surface 112 of the pipeline does not misalign the ILI tool 100B relative to the centerline of the pipeline 104.

Lock and Pull Drive System

FIG. 3A shows a third embodiment of the tractor drive system 102C in the form of a "lock and pull" drive system. The tractor drive system 102C includes a drive section 106C arranged at one end of the ILI tool 100C. The drive section 106C includes a central body portion 110C, two annular disks or cups 48, and a drive mechanism 114C. In some embodiments, a suspension mechanism (not shown) configured to suspend the drive section 106C within the pipeline 104 is provided in addition to or instead of the cups 48. The drive section 106C in the embodiment shown is arranged at a foremost end of ILI tool 100C relative to the product flow direction as indicated by arrow 108. In other embodiments, the drive section 106C can be arranged at a rearmost end of the ILI tool 100C or intermediate the foremost and rearmost ends of the tool 100C. In still further embodiments, the tool 100C includes multiple drive sections 106C arranged at any position along the tool 100C. The drive section 106C and other sections 24 are tethered one behind the other via the tow links 44 that allow the respective sections 24, 106C to pass individually through bends (not shown) in the pipeline 104.

The central body portion 110C of the drive section 106C is configured to support various electronics and mechanical members that facilitate forward movement of the ILI tool 100C. The body portion 110C defines a central axis 115 of the drive section 106C and extends axially along the central axis 115. The body portion 110C has an outer surface 116C that encircles the central axis 115. The outer surface 116C in some embodiments defines features that cooperate with the various electronics and mechanical members of the ILI tool 100C.

The two of the cups 48 of the drive section 106C are arranged at opposite axial ends of the body portion 110C in spaced relation to one another. The cups 48 are sized to contact the inner surface 112 of the pipeline 104 and align the central axis 115 of the drive section 106C with the central axis of the pipeline 104. The cups 48 have a solid or flexible structure formed from a polymer material such as polyurethane (PU).

The drive mechanism 114C of the drive section 106C is supported by the body portion 110C. The drive mechanism 114C includes at least one clamp 140, at least one guide member 142, a first actuator, and a second actuator. The clamp 140 is positionable against the inner surface 112 of the pipeline 104. The guide member 142 is positionable along a portion of the body portion 110C. The clamp 140 cooperates with the guide member 142 to orient the clamp 140 substantially parallel to the inner surface 112 of the pipeline 104 along the portion of the clamp 140 that is positionable against the inner surface 112. In some embodiments, the clamp 140 has magnetic properties that facilitate adherence of the clamp 140 against the inner surface 112 of the pipeline 104. In other embodiments, the clamp 140 has a coating or similar covering that improves the coefficient of friction of the clamp 140 against the inner surface 112.

The first actuator of the drive mechanism 114C is configured to change a radial position of the clamp 140 relative to the body portion 110C. The first actuator positions the clamp 140 between a first position in which the clamp 140 is spaced from the inner surface 112 of the pipeline 104 and a second position in which the clamp 140 is clamped against the inner surface 112 of the pipeline 104. The first actuator includes any mechanism that changes the radial position of the clamp 140 such as a linkage, chain, gear, screw, or the like. The second actuator of the drive mechanism 114C is configured to change an axial position of the guide member 142 relative to the body portion 110C. The second actuator positions the guide member 142 between a first position in which the guide member 142 is located proximate to a forward end of the body portion 110C and a second position in which the guide member 142 is located proximate to a rearward end of the body portion 110C.

With the clamp 140 held against the inner surface 112 of the pipeline 104 in the second position by the first actuator, movement of the guide member 142 between the first and second positions by the second actuator causes axial movement of the ILI tool 100C relative to the pipeline 104. The primary movement of the ILI tool 100C is axially forward relative to the pipeline 104 when the clamp 140 is held against the inner surface 112 and the guide member 142 is moved from the first position to the second position. If desired, the ILI tool 100C can also be moved axially rearward relative to the pipeline 104 if the clamp 140 is held against the inner surface 112 and the guide member 142 is moved from the second position to the first positon although the primary movement is typically sufficient to dislodge the ILI tool 100C from the problematic feature. However, if axially reward movement of the ILI tool 100C is desired, it is preferable for the tool 100C to include a second, rearward facing drive section 106C (not shown) positioned at the rearmost end of the tool. The drive mechanism 114C in some embodiments may include one or more sensors (not shown) configured to measure the force at which the clamp 140 is held in contact against inner surface 112 so as to ensure the clamp 140 does not slip relative to the inner surface 112 when the position of the guide member 142 is moved between the first and second positions.

In the embodiment shown, the guide member 142 defines a groove 144 that is configured to accept a corresponding protrusion 146 on the clamp 140 in order to guide the clamp 140 between the first and second positions. The groove 144 and the protrusion 146 each have corresponding planar support faces that are oriented perpendicular to the central axis 115 of the drive section 106C. The support faces enable the transfer of axial forces between the protrusion 146 of the clamp and the groove of the guide member 142 when the clamp 140 is in the second position and the guide member 142 is moved between the first and second positions.

The drive mechanism 114C in the embodiment shown has two each of the clamp 140, the guide member 142, and the first and second actuators. In other embodiments, the drive mechanism 114C has more or less than two each of the clamp 140, the guide member 142, and the first and second actuators. The clamps 140 are generally spaced equally from one another about the body portion 110C such that a reaction force on the body portion 110C from the force of the clamps 140 against the inner surface 112 of the pipeline does not misalign the ILI tool 100C relative to the centerline of the pipeline 104.

Operation of the Tractor Drive System

A process for facilitating movement of an ILI tool past a problematic feature in a pipeline is now described with reference to FIGS. 1-3B. A typical ILI tool such as the ILI tool 100A-C has an optimal inspection speed of approximately 3 to 6 feet per second. Since the ILI tool 100A-C is a "free-swimming" tool, the flow rate of the gaseous product in the pipeline determines the speed of the ILI tool 100A-C. A sudden reduction in the speed of the ILI tool 100A-C such as from 6 feet per second to 2 feet per second or less over a predetermined time period without a corresponding drop in product flow rate suggests that the tool 100A-C has encountered a problematic feature in the pipeline 104.

An example problematic feature in the form of a heavy weld 123 is depicted on the inner surface of the 112 of the pipeline 104 in FIGS. 3A and 3B. The problematic feature may cause the ILI tool 100A-C to completely stop in the pipeline. If forward motion of the ILI tool 100A-C is not restored quickly, pressure will rapidly build behind the ILI tool 100A-C from the continued flow of the product toward the stopped tool 100C. The pressure continues to build until the increasing pressure becomes sufficient enough to dislodge the ILI tool 100A-C from the problematic feature at which time the increased gas pressure behind the tool 100A-C propels the tool rapidly forward at a speed well beyond the upper limits of the predetermined inspection speed.

The over-speed condition lasts until equilibrium is achieved and may occur over an extended portion of the pipeline such as from 300 feet to 1500 feet depending on the volume of product supplied, the diameter of the pipeline, and other conditions. The data acquired by the ILI tool 100A-C during the over-speed condition may be less accurate or even unusable. The tractor drive system 102A-C discussed above with reference to FIGS. 1-3A mitigates/eliminates the realization of an over-speed condition by facilitating forward movement of the ILI tool 100A-C if the tool encounters a problematic feature in the pipeline and by greatly reducing energy build up as the tractor drive system 102A-C helps to quickly move the tool 100A-C over the problematic feature.

With reference again to FIG. 1, the process is described in connection with the first embodiment of the tractor drive system 102A. The second actuator 122 maintains the wheel 118 in the first position while the ILI tool 100A moves through the pipeline 104 at the predetermined inspection speed. At the moment the ILI tool 100A encounters a problematic feature and the tool 100A effectively stops in the pipeline 104, the second actuator 122 is actuated to position the wheel 118 in the second position against the inner surface 112 of the pipeline 104 and the first actuator 120 is actuated to rotate the wheel 118 in the first direction. The rotation of the wheel 118 in the first direction while the wheel 118 is positioned in contact with the inner surface 112 of the pipeline 104 causes the ILI tool 100A to move axially forward until the problematic feature no longer obstructs movement of the tool 100A through the pipeline.

The actuation of the first actuator 120 in one embodiment is selective and lasts only for the duration of time in which the movement of the ILI tool 100A is impeded by the problematic feature such as from 1 to 120 seconds. Once the ILI tool 100A clears the problematic feature, the second actuator 122 is actuated to position the wheel 118 in the first position and actuation of the first actuator 120 is ceased so that the wheel 118 no longer rotates in the first direction.

In an alternative embodiment, the wheel 118 is maintained in contact with the inner surface 112 of the pipeline 104 for all speeds and for stoppage of the ILI tool 100A in the pipeline 104. In this alternative embodiment, the first actuator 120 is continuously actuated to rotate the wheel 118 in the first direction at a rotational speed configured to propel the ILI tool 100A at a baseline speed. The baseline speed is preferably a speed less than the predetermined inspection speed of the ILI tool 100A such that the wheel 118 does not propel the ILI tool 100A unless the speed of the ILI tool 100A drops below the predetermined speed. In this alternative embodiment, the drive mechanism 114A includes a ratchet mechanism (not shown) that permits the wheel 118 to rotate at a rotational speed that is different than the rotational speed that would result by actuating the wheel 118 with the first actuator 120. If the speed of the ILI tool 100A falls below the predetermined speed provided by continuous actuation of the wheel 118 by the first actuator 120, the wheel 118 propels the ILI tool 100A at the predetermined speed.

With reference again to FIG. 2, the process is described in connection with the second embodiment of the tractor drive system 102B. The second actuator 122 maintains the track mechanism 124 in the first position while the ILI tool 100B moves through the pipeline 104 at the predetermined inspection speed. At the moment the ILI tool 100B encounters a problematic feature and the tool 100B effectively stops in the pipeline 104, the second actuator 122 is actuated to position the track mechanism 124 in the second position against the inner surface 112 of the pipeline 104 and the first actuator 132 is actuated to rotate the drive wheel 128 in the first rotational direction which causes the track 126 to move in the first track direction. The movement of the track 126 in the first track direction while the track mechanism 124 is positioned in contact with the inner surface 112 of the pipeline 104 causes the ILI tool 100B to move axially forward until the problematic feature no longer obstructs movement of the tool 100B through the pipeline.

The actuation of the first actuator 132 in one embodiment is selective and lasts only for the duration of time in which the movement of the ILI tool 100B is impeded by the problematic feature such as from 1 to 120 seconds. Once the ILI tool 100B clears the problematic feature, the second actuator is actuated to position the track mechanism 124 in the first position and actuation of the first actuator 132 is ceased so that the track 126 no longer moves in the first track direction.

In an alternative embodiment, the track mechanism 124 is maintained in contact with the inner surface 112 of the pipeline 104 for all speeds and for stoppage of the ILI tool 100B in the pipeline 104. In this alternative embodiment, the first actuator 132 is continuously actuated to move the track 126 in the first track direction to propel the ILI tool 100B at a baseline speed. The baseline speed is preferably a speed less than the predetermined inspection speed of the ILI tool 100B such that the track 126 does not propel the ILI tool 100B unless the speed of the ILI tool 100B drops below the predetermined speed. In this alternative embodiment, the drive mechanism 114B includes a ratchet mechanism (not shown) that permits the track 126 to move at a speed that is different than the speed that would result by actuating the track 126 with the first actuator 132. If the speed of the ILI tool 100B falls below the predetermined speed provided by continuous actuation of the track 126 by the first actuator 132, the track 126 propels the ILI tool 100B at the predetermined speed.

With reference again to FIG. 3A and to FIG. 3B, the process is described in connection with the third embodiment of the tractor drive system 102C. FIGS. 3A and 3B depict the same ILI tool 100C, but FIG. 3A shows the guide member 142 in the first position while FIG. 3B shows the guide member 142 in the second position. In addition, FIG. 3A shows a rearmost section 24 of the ILI tool 100C partially obstructed by a problematic feature in the form of a weld 123 while FIG. 3B shows the rearmost section 24 of the ILI tool 100C positioned axially forward of the weld 123.

The first actuator maintains the clamp 140 in the first position and the second actuator maintains the guide member 142 in the first position while the ILI tool 100C moves through the pipeline 104 at the predetermined inspection speed. At the moment the ILI tool 100C encounters a problematic feature 123 and the tool 100C effectively stops in the pipeline 104, the first actuator is actuated to position the clamp 140 in the second position against the inner surface 112 of the pipeline 104 as shown in FIG. 3A. At the moment the clamp 140 is clamped to the inner surface 112, the second actuator is actuated to move the guide member 142 from the first position (FIG. 3A) to the second position (FIG. 3B).

The clamping of the clamp 140 against the inner surface 112 fixes the position of the clamp 140 and the guide member 142 relative to the pipeline 104 as illustrated in FIGS. 3A and 3B. Upon actuation of the second actuator to move the guide member 142 from the first position to the second position, the body portion 110C and therefore the entire ILI tool 100C moves axially forward relative to the pipeline 104, the clamp 140, and the guide member 142. The ILI tool 100C moves a distance X that corresponds to the distance over which the body portion 110C moves relative to the guide member 142 between the first and second positions of the guide member 142.

Once the guide member 142 is positioned in the second position, the first actuator is actuated to retract the clamp 140 away from the inner surface 112 of the pipeline 104. The second actuator is then actuated to position the guide member 142 in the first position. If the ILI tool 100C is still encountering the problematic feature 123 and the tool 100C remains effectively stopped in the pipeline 104, the first and second actuator are actuated again according to the sequence described above in order to increment the ILI tool 100C axially forward by a further distance X. Once the ILI tool 100C clears the problematic feature, the first actuator maintains the clamp 140 in the first positon and the second actuator maintains the guide member 142 in the first position.

Operation and control of the ILI tool 100A-C with the tractor drive system 102A-C is performed with the aid of a controller. The controller, for example, is a self-contained, dedicated mini-computer having a central processor unit (CPU) with electronic storage and optionally a display or user interface (UI). The controller includes a sensor input and control circuit. The controller may further include memory storage for data and programmed instructions.

Active Brake System

FIGS. 4-7 depict an ILI tool 200A-D with an active brake system 202A-D configured to regulate a speed of the tool 200A-D through a pipeline 104. The active brake system 202A-D is described herein with reference to four different embodiments although more embodiments are possible. Features of the brake system that are essentially identical among the different embodiments are identified with the same reference number. Features that are similar among the different embodiments, but have different structural characteristics or other attributes, are denoted with the same reference number followed by a capital letter (i.e., 202A, 202B, 202C, etc.). Features that are unique to each embodiment are identified with a unique reference number.

Active Brake System with Expandable Cup

FIG. 4 shows a first embodiment of the active brake system 202A. The active brake system 202A includes a brake section 206A arranged at one end of the ILI tool 200A. The brake section 206A includes a central body portion 210A, two annular disks or cups 48, and a brake mechanism 214A. In some embodiments, a suspension mechanism (not shown) configured to suspend the brake section 206A within the pipeline 104 is provided in addition to or instead of the cups 48. The brake section 206A in the embodiment shown is arranged at a rearmost end of ILI tool 200A relative to the product flow direction as indicated by arrow 108. In other embodiments, the brake section 206A can be arranged at a foremost end of the ILI tool 200A or intermediate the foremost and rearmost ends of the tool 200A. In still further embodiments, the tool 200A includes multiple brake sections 206A arranged at any position along the tool 200A. The brake section 206A and other sections 24 are tethered one behind the other via flexible joints or tow links 44 that allow the respective sections 24, 206A to pass individually through bends (not shown) in the pipeline 104.

The central body portion 210A of the brake section 206A is configured to support various electronics and mechanical members that facilitate regulation of the speed of the ILI tool 200A. The body portion 210A defines a central axis 215 of the brake section 206A and extends axially along the central axis 215. The body portion 210A has an outer surface 216A that encircles the central axis 215. The outer surface 216A in some embodiments defines features that cooperate with the various electronics and mechanical members of the ILI tool 200A.

The two annular disks or cups 48, 148 and/or the suspension mechanism of the brake section 206A are sized to contact the inner surface 112 of the pipeline 104 and align the central axis 215 of the brake section 206A with the central axis of the pipeline 104. The cups 48, 148 are arranged at opposite axial ends of the body portion 210A in spaced relation to one another. The rearmost cup 148 is formed from a polymer material such as polyurethane (PU) and includes an expandable portion 401 configured to be expanded radially outward against the inner surface 112 of the pipeline 104. In the embodiment shown, the expandable portion 401 is disposed proximate the rearmost end of the rearmost cup 148. The expandable portion 401 encircles the central axis 215 of the brake section 206A. In other embodiments, the expandable portion 401 only partially encircles the central axis 215.

The brake mechanism 214A of the brake section 206A is supported by one or more of the body portion 210A and the rearmost cup 148. The brake mechanism 214A includes a linkage arrangement 402 and a first actuator 404. The linkage arrangement 402 is configured to cooperate with the rearmost cup 148. The first actuator 404 is configured to apply a variable force to the linkage arrangement 402. The linkage arrangement 402 in one embodiment is mounted to the rearmost cup 148 proximate to an outer surface 406 of the cup 148. The outer surface 406 faces in a generally axially rearward direction opposite the product flow direction 108. The linkage arrangement 402 in one embodiment is configured to receive an axial input force 408 from the first actuator 404 and transmit a radial output force 410 to the expandable portion 401 of the cup 148.

The transmission of the radial output force 410 to the expandable portion 401 causes the expandable portion 401 to expand outwardly against the inner surface 112 of the pipeline and generate a friction force on the ILI tool 200A. The first actuator is further configured to adjust the axial input force 408 on the linkage arrangement 402, which in turn adjusts the radial output force 410 on the expandable portion 401 against the inner surface 112, so as to adjust the resulting friction force on the ILI tool 200A as the tool 200A is moved through the pipeline 104. The speed of the ILI tool 200A is regulated by adjusting the resulting friction force on the tool 200A.

Active Brake System with Wear Element

FIG. 5 shows a second embodiment of the active brake system 202B. The active brake system 202B includes a brake section 206B arranged at one end of the ILI tool 200B. The brake section 206B includes a central body portion 210B, two annular disks or cups 48, and a brake mechanism 214B. In some embodiments, a suspension mechanism (not shown) configured to suspend the brake section 206B within the pipeline 104 is provided in addition to or instead of the cups 48. The brake section 206B in the embodiment shown is arranged at a rearmost end of ILI tool 200B relative to the product flow direction as indicated by arrow 108. In other embodiments, the brake section 206B can be arranged at a foremost end of the ILI tool 200B or intermediate the foremost and rearmost ends of the tool 200B. In still further embodiments, the tool 200B includes multiple brake sections 206B arranged at any position along the tool 200B. The brake section 206B and other sections 24 are tethered one behind the other via the tow links 44 to allow the respective sections 24, 206B to pass individually through bends (not shown) in the pipeline 104.

The central body portion 210B of the brake section 206B is configured to support various electronics and mechanical members that facilitate regulation of the speed of the ILI tool 200B. The body portion 210B defines a central axis 215 of the brake section 206B and extends axially along the central axis 215. The body portion 210B has an outer surface 216B that encircles the central axis 215. The outer surface 216B in some embodiments defines features that cooperate with the various electronics and mechanical members of the ILI tool 200B.

The two annular disks or cups 48 and/or the suspension mechanism of the brake section 206B are/is sized to contact the inner surface 112 of the pipeline 104 and align the central axis 215 of the brake section 206B with the central axis of the pipeline 104. The cups 48 are arranged at opposite axial ends of the body portion 210B in spaced relation to one another. The cups 48 have a solid or flexible structure formed from a polymer material such as polyurethane (PU) or the suspension mechanism is provided.

The brake mechanism 214B of the brake section 206B is supported by the body portion 210B. The brake mechanism 214B includes at least one wear element 502 and a first actuator 506. The wear element 502 is positionable against the inner surface 112 of the pipeline 104. In some embodiments, the brake mechanism 214B also includes a guide member 504 rotatably connected at one end to the wear element 502 and rotatably connected at the other end to the body portion 210B. The guide element 504 defines an arcuate path for the wear element 502. In other embodiments, the wear element 502 is supported within a groove (e.g., 712 in FIG. 7) defined by the body portion 210B with the groove defining a linear path for the wear element 502.

The first actuator 506 of the brake mechanism 214B is configured to change a radial position of the wear element 502 relative to the body portion 210B. The first actuator 506 positions the wear element between a first position in which the wear element 502 is spaced from the inner surface 112 of the pipeline 104 and a second position in which the wear element 502 is in contact with the inner surface 112 of the pipeline 104. When the wear element 502 is in the second position, the first actuator is further configured to adjust a radially outward force on the wear element 502 against the inner surface 112 of the pipeline so as to adjust the resulting friction force on the ILI tool 200B as the tool is moved through the pipeline. The speed of the ILI tool 200B is regulated by adjusting the resulting friction force on the tool 200B.

The brake mechanism 214B in the embodiment shown has two wear elements 502 each with a respective first actuator 506. In other embodiments, the brake mechanism 214B has more or less than two wear elements 502 and two first actuator 506. In yet further embodiments, all of the wear elements 502 are positioned by any number of the first actuators. The wear elements 502 and the first actuators are generally spaced equally from one another about the body portion 210B such that a reaction force on the body portion 210B from the force of the wear elements 502 against the inner surface 112 of the pipeline 104 does not misalign the ILI tool 200B relative to the centerline of the pipeline 104. In other embodiments, the wear elements 502 and the first actuators are not spaced equally from one another about body portion 210B.

Wheel Brake System

FIG. 6 shows a third embodiment of the active brake system 202C. The active brake system 202C includes a brake section 206C arranged at one end of the ILI tool 200C. The brake section 206C includes a central body portion 210C, two annular disks or cups 48, and a brake mechanism 214C. In some embodiments, a suspension mechanism (not shown) configured to suspend the brake section 206C within the pipeline 104 is provided in addition to or instead of the cups 48. The brake section 206C in the embodiment shown is arranged at a rearmost end of ILI tool 200C relative to the product flow direction 108. In other embodiments, the brake section 206C can be arranged at a foremost end of the ILI tool 200C or intermediate the foremost and rearmost ends of the tool 200C. In still further embodiments, the tool 200C includes multiple brake sections 206C arranged at any position along the tool 200C. The brake section 206C and other sections 24 are tethered one behind the other via the tow links 44 to allow the respective sections 24, 206C to pass individually through bends (not shown) in the pipeline 104.

The central body portion 210C of the brake section 206C is configured to support various electronics and mechanical members that facilitate regulation of the speed of the ILI tool 200C. The body portion 210C defines a central axis 215 of the brake section 206C and extends axially along the central axis 215. The body portion 210C has an outer surface 216C that encircles the central axis 215. The outer surface 216C in some embodiments defines features that cooperate with the various electronics and mechanical members of the ILI tool 200C.

The two annular disks or cups 48 and/or the suspension mechanism of the brake section 206C are/is sized to contact the inner surface 112 of the pipeline 104 and align the central axis 215 of the brake section 206C with the central axis of the pipeline 104. The cups 48 are arranged at opposite axial ends of the body portion 210C in spaced relation to one another. The cups 48 have a solid or flexible structure formed from a polymer material such as polyurethane (PU).

The brake mechanism 214C of the brake section 206C is supported by the body portion 210C. The brake mechanism 214C includes at least one wheel 602, at least one brake device 604, a first actuator (not shown), and a second actuator 606. The wheel 602 is positionable against the inner surface 112 of the pipeline 104. The brake device 604 is configured to slow a rotation of the wheel 602. The wheel 602 has a wheel axis (not shown) that is oriented substantially perpendicular to the central axis 215 of the brake section 206C such that slowing the rotation of the wheel 602 when positioned against the inner surface 112 of the pipeline 104 causes slowing of the speed of the ILI tool 200C relative to the pipeline 104. The first actuator is configured to actuate the brake device to slow the rotation of the wheel 602.

The brake device 604 in one embodiment is configured as a disk brake. The brake device 604 in this embodiment includes a brake disk mounted to the wheel 602 for rotation with the wheel and a brake caliper that is supported by the body portion 210C. The brake caliper includes brake pads that straddle the brake disk such that when the brake pads are pressed against the surface of the brake disk by the first actuator, the brake pads generate a friction force on the brake disk, which in turn generates a torque on the wheel and slows or stops the rotation of the brake disk and the wheel 602.

The brake device 604 in another embodiment is configured as a drum brake. The brake device 604 in this embodiment includes a drum mounted to the wheel 602 for rotation with the wheel and a brake shoe assembly supported by the body portion 210C. The brake shoe assembly includes brake shoes nested within the drum such that when the brake shoes are pressed against the surface of the drum by the first actuator, the brake shoes generate a friction force on the drum, which in turn generates a torque on the wheel and slows or stops the rotation of the drum and the wheel 602. The speed of the ILI tool 200C is regulated by adjusting the friction force on the wheel 602 generated by the brake device 604. In yet further embodiments, the brake device 604 may include a chain drive, a gear drive, or the like configured to slow or stop the rotation of the wheel 602.

The second actuator 606 is configured to change a radial position of the wheel 602 relative to the body portion 210C. The second actuator 606 positions the wheel 602 between a first position in which the wheel 602 is spaced from the inner surface 112 of the pipeline 104 and a second position in which the wheel 602 is in contact with the inner surface 112 of the pipeline 104. In the embodiment shown, the second actuator 606 has an elongate body that is connected at one end to a pivot (not shown) on the body portion 210C and at the other end to the wheel 602. The second actuator 606 in this embodiment moves the wheel 602 along an arcuate path between the first and second positions by rotation about the pivot on the body portion 210C. In other embodiments, the second actuator 606 moves radially inwardly and outwardly along a linear path relative to the body portion 210C in order to position the wheel 602 in the first and second positions.

The brake mechanism 214C in the embodiment shown has two wheels 602 and two brake devices 604 each with a respective first actuator and a respective second actuator 606. In other embodiments, the brake mechanism 214C has more or less than two wheels 602, two brake devices 604, two first actuators, and two second actuators 606. In yet further embodiments, all of the wheels 602 are slowed and positioned by any number of the first actuators and the second actuators 606. The wheels 602 are generally spaced equally from one another about the body portion 210C such that a reaction force on the body portion 210C from the force of the wheels 602 against the inner surface 112 of the pipeline does not misalign the ILI tool 200C relative to the centerline of the pipeline 104.

Track Brake System

FIG. 7 shows a fourth embodiment of the active brake system 202D. The active brake system 202D includes a brake section 206D arranged at one end of the ILI tool 200D. The brake section 206D includes a central body portion 210D, two annular disks or cups 48, and a brake mechanism 214D. In some embodiments, a suspension mechanism (not shown) configured to suspend the brake section 206D within the pipeline 104 is provided in addition to or instead of the cups 48. The brake section 206D in the embodiment shown is arranged at a rearmost end of ILI tool 200D relative to the product flow direction 108. In other embodiments, the brake section 206D can be arranged at a foremost end of the ILI tool 200D or intermediate the foremost and rearmost ends of the tool 200D. In still further embodiments, the tool 200D includes multiple brake sections 206D arranged at any position along the tool 200D. The brake section 206D and other sections 24 are tethered one behind the other via the tow links 44 to allow the respective sections 24, 206D to pass individually through bends (not shown) in the pipeline 104.

The central body portion 210D of the brake section 206D is configured to support various electronics and mechanical members that facilitate regulation of the speed of the ILI tool 200D. The body portion 210D defines a central axis 215 of the brake section 206D and extends axially along the central axis 215. The body portion 210D has an outer surface 216D that encircles the central axis 215. The outer surface 216D in some embodiments defines features that cooperate with the various electronics and mechanical members of the ILI tool 200D.

The two annular disks or cups 48 and/or the suspension mechanism of the brake section 206D are/is sized to contact the inner surface 112 of the pipeline 104 and align the central axis 215 of the brake section 206D with the central axis of the pipeline 104. The cups 48 are arranged at opposite axial ends of the body portion 210D in spaced relation to one another. The cups 48 have a solid or flexible structure formed from a polymer material such as polyurethane (PU).

The brake mechanism 214C of the brake section 206D is supported by the body portion 210D. The brake mechanism 114B includes at least one track mechanism 702, at least one brake device 710, a first actuator, and a second actuator. The track mechanism 702 includes a track 704, at least one brake wheel 706, and at least one guide wheel 708. The track 704 is positionable against the inner surface 112 of the pipeline 104. The guide wheel 708 is spaced axially from the brake wheel 706. The track 704 cooperates with the brake wheel 706 and the guide wheel 708 to orient the track 704 substantially parallel to the inner surface 112 of the pipeline 104 along the portion of the track 704 that is positionable against the inner surface 112.

The brake device 710 is configured to slow a rotation of the brake wheel 706. The brake wheel 706 cooperates with the track 704 to slow a movement of the track 704 relative to the inner surface 112 when the rotation of the brake wheel 706 is slowed by the brake device 710. The brake wheel 706 and the guide wheel 708 each have a wheel axis (not shown) that is oriented substantially perpendicular to the central axis 215 of the brake section 206D such that slowing the movement of the track 704 when positioned against the inner surface 112 of the pipeline 104 causes slowing of the axial movement of the ILI tool 200D relative to the pipeline 104.

The first actuator of the brake mechanism 214D is configured to actuate the brake device 710 to generate a friction force on brake wheel 706 so as to slow the rotation of the brake wheel 706, which in turn slows the movement of the track 704. The brake device 710 in some embodiments is configured as a disk brake or as a drum brake. In other embodiments, the brake device utilizes magnets or electromagnetics to slow the rotation of the brake wheel 706. In some embodiments, the track mechanism 702 includes a second brake wheel (not shown) in addition to or in place of the guide wheel 708 such that the track mechanism 702 has at least two brake wheels. The rotation of the second brake wheel can be slowed by the brake device 710 or by a further brake device (not shown) that is configured to slow the rotation of the second brake wheel in the same manner as the brake device 710. The further brake device can be actuated by the first actuator or by a further actuator.

The speed of the ILI tool 200D is regulated by adjusting the friction force on the brake wheel 706 generated by the brake device 710 which in turn adjust the movement of the track 704. The speed of the ILI tool 200D can also be regulated by adjusting the force of the track 704 against the inner surface 112 of the pipeline 104. The track 704 can be pushed against the inner surface 112 while the track is permitted to move along its track path or while the track 704 is fixed against movement along its track path. Increasing the force of the track 704 against the inner surface 112 while the track is permitted to move along its track path increases the friction between the moving components of the track mechanism 702. Increasing the force of the track 704 against the inner surface 112 while the track 704 is fixed against movement along its track path utilizes the fixed track 704 as a wear element in a manner similar to the wear element 502 described with reference FIG. 5.

The second actuator of the brake mechanism 214D is configured to change a radial position of the track mechanism 702 relative to the body portion 210D. The second actuator positions the track mechanism 702 between a first position in which the track 704 is spaced from the inner surface 112 of the pipeline 104 and a second position in which the track 702 is in contact with the inner surface 112 of the pipeline 104. In the embodiment shown, the body portion 210D defines a groove 712 that is configured to accept a corresponding protrusion 714 on the track mechanism 702 in order to guide the track mechanism 702 between the first and second positions. The groove 712 and the protrusion 714 each have corresponding planar support faces that are oriented perpendicular to the central axis 215 of the brake section 206D. The support faces enable the protrusion 714 to transfer an axial force from the track mechanism 702 to the groove 712 of the body portion 210D when the track mechanism 702 is in the second position and the brake device 710 slows the speed of the moving track 704.

The brake mechanism 214D in the embodiment shown has two track mechanisms 702 each with a respective brake device 710. In other embodiments, the brake mechanism 214D has more or less than two track mechanisms 702 and two brake devices. In yet further embodiments, all of the tracks 704 are slowed and positioned by any number of the first and second actuators. The track mechanisms 702 are generally spaced equally from one another about the body portion 210D such that a reaction force on the body portion 210D from the force of the tracks 702 against the inner surface 112 of the pipeline does not misalign the ILI tool 100D relative to the centerline of the pipeline 104.

In one embodiment, the brake sections 206C, 206D described with reference to FIGS. 6 and 7 are configured to recover energy during the slowing/braking of the ILI tool 200C, 200D in the pipeline 104. When the wheel 602 is pressed against the inner surface 112 of the pipeline 104 while the ILI tool 200C is moving relative to the pipeline 104, the contact between the wheel 602 and the inner surface 112 rotates the wheel. The brake device 604 in this embodiment includes an electromechanical device (not shown) that converts the rotational energy of the rotating wheel 602 to electrical energy to charge one or more batteries of the ILI tool 200C.

Similarly, when the track 704 is pressed against inner surface 112 of the pipeline while the ILI tool 200D is moving relative to the pipeline 104, the contact between the track 704 and the inner surface moves the track 704. The brake device 710 in this embodiment includes an electromechanical device (not shown) that converts the mechanical energy of the moving track 704 to electrical energy to charge one or more batteries of the ILI tool 200D.

Although the ILI tool 100A-C of FIGS. 1-3B is described in connection only with the tractor drive section 102A-C, the ILI tool 100A-C can also include the active brake system 202A-D described above with reference to FIGS. 4-7. Similarly, although the ILI tool 200A-D of FIGS. 4-7 is described in connection only with the active brake system 202A-D, the ILI tool 200A-D can also include the tractor drive system 102A-C described above with reference to FIGS. 1-3B. Furthermore, the ILI tool 100A-C, 200A-D can include multiple drive sections 106A-C having the same or different embodiments and multiple brake sections 206A-D having the same or different embodiments.

Operation of an ILI Tool with a Tractor Drive System and an Active Brake System

A process for operating an ILI tool with a tractor drive system and an active brake system in a pipeline is now described with reference to FIGS. 1-7. When the ILI tool 100A-C, 200A-D is propelled through the pipeline within the predetermined speed range in normal operating conditions, the tractor drive system and the active brake system are not engaged to physically interact with the pipeline. If the tool encounters a problematic feature such as heavy weld 123 (FIGS. 3A and 3B) and the tool rapidly decelerates or stops, the tractor drive system 102A-C immediately takes action to move the tool over the weld. Normally, only the first one or two sections of a multi-section tool need assistance clearing the weld. The other sections have relatively low drag and are less sensitive to the size of the weld. Although the tractor drive system 102A-C moves the tool past the weld quickly, some delta pressure has still accumulated behind the tool 100A-C, 200A-D because the volumes are small. As a result, the delta pressure can rapidly accelerate the tool in a very short period of time.

For instance, the tool may stop for one second, and the tractor drive system 102A-C moves the tool over the weld in 10 seconds. In the meantime, the pressure behind the tool has been building for 4 or 5 seconds. Upon dislodgement from the weld, the tool instantly speeds up to for example to 8 feet per second. The tool then detects that it is accelerating and immediately applies the active brake system 202A-D to apply a braking force. The brake force can be varied to maintain a current speed or to slow the tool if the current speed exceeds the predetermined speed. Alternatively, the active brake system 202A-D may apply maximum brake force at the moment of dislodgement so as to avoid an over-speed condition altogether. The brake force is then gradually released until the tool reaches is target inspection speed.

The tractor drive system 102A-C in some embodiments is configured to move the tool only when the tool stops. In these embodiments, the tractor drive system 102A-C deactivates when the tool reaches, for example, 1 foot per second. In the meantime, the accumulated delta pressure causes the tool to accelerate to the point that the active brake system 202A-D engages to prevent the accumulated energy from causing an overspeed condition. In one example, the speed of the tool would normally rapidly increase to 12 or 15 feet per second from the stored energy, but the active brake system 202A-D keeps the speed below 10 feet per second. Alternatively, if the tool reaches 12 feet per second, the active brake system 202A-D would limit that over-speed condition to a short length of the pipeline, for example, 2 feet. The tractor drive system 102A-C and the active brake system 202A-D prevent over-speed conditions in most cases. If an over-speed condition does occur, the tractor drive system 102A-C and the active brake system 202A-D greatly reduce the duration and magnitude of such a condition.

The foregoing detailed description of one or more embodiments of the in-line inspection tool has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A pipeline inspection tool, comprising:
   a plurality of sections arranged in a line and tethered together via tow links, the plurality of sections including a forward section with a first tow link coupled to a rear side of the first section, the forward section including:
   a body with at least one annular cup arranged on the body such that the body is configured to be moved by a compressible product moving through a pipeline; and
   a speed control mechanism supported by the body, the speed control mechanism including (i) a contact surface configured to be positioned against an inner surface of the pipeline, (ii) a controller configured to determine when a speed of the body deviates from a predetermined range of speeds, (iii) a first actuator configured to act on the contact surface to adjust the speed of the body when the speed of the body deviates from the predetermined range of speeds, and (iv) a second actuator configured to position the contact surface between (a) a first position in which the contact surface is disposed against the inner surface of the pipeline and (b) a second position in which the contact surface is spaced from the inner surface of the pipeline.

2. The pipeline inspection tool of claim 1, wherein the second actuator is configured to selectively dispose the contact surface against the inner surface of the pipeline only when the speed of the body deviates from the predetermined range of speeds.

3. The pipeline inspection tool of claim 1, wherein the contact surface is included on a wheel oriented for rolling contact with the inner surface and, when the speed of the body deviates from the predetermined range, the first actuator is configured to generate a torque on the wheel such that the wheel adjusts the speed of the body towards the predetermined range.

4. The pipeline inspection tool of claim 3, wherein:
   when the speed of the body is below the predetermined range, the first actuator generates the torque on the wheel in a first direction such that the wheel increases the speed of the body, and
   when the speed of the body is above the predetermined range, the first actuator generates the torque on the wheel in a second direction such that the wheel decreases the speed of the body.

5. The pipeline inspection tool of claim 4, wherein the first actuator is a rotary electric machine configured to operate in a drive mode in which the machine generates the torque on the wheel in the first direction and a regenerative mode in which the machine generates the torque on the wheel in the second direction.

6. The pipeline inspection tool of claim 5, wherein the first actuator includes an electric motor and a brake, the electric motor configured to generate the torque on the wheel in the first direction and the brake configured to generate the torque on the wheel in the second direction.

7. The pipeline inspection tool of claim 1, wherein:
   the contact surface is included on a track mechanism that includes a track and a drive wheel, the track oriented for rolling contact with the inner surface of the pipeline and the drive wheel configured to move the track in a track path, and
   when the speed of the body deviates from the predetermined range, the first actuator is configured to generate a torque on the drive wheel such that the track adjusts the speed of the body towards the predetermined range.

8. The pipeline inspection tool of claim 7, wherein:
   when the speed of the body is below the predetermined range, the first actuator generates the torque on the drive wheel in a first direction such that the track increases the speed of the body, and
   when the speed of the body is above the predetermined range, the first actuator generates the torque on the drive wheel in a second direction such that the track decreases the speed of the body.

9. The pipeline inspection tool of claim 8, wherein the first actuator is a rotary electric machine configured to operate in a drive mode in which the machine generates the torque on the drive wheel in the first direction and a regenerative mode in which the machine generates the torque on the drive wheel in the second direction.

10. A method of moving a pipeline inspection tool including a plurality of tethered sections through a pipeline, the method comprising:
    positioning the pipeline inspection tool in the pipeline, the pipeline inspection tool including:

a body with at least one annular cup arranged on the body such that the body is configured to be moved by a compressible product moving through the pipeline; and a speed control mechanism supported by the body, the speed control mechanism including (i) a contact surface, (ii) a controller configured to determine when a speed of the body deviates from a predetermined range of speeds, (iii) a first actuator coupled to the contact surface and configured to act on the contact surface to adjust a speed of the body when the speed of the body deviates from a predetermined range of speeds, and (iv) a second actuator configured to position the contact surface between (a) a first position in which the contact surface is disposed against an inner surface of the pipeline and (b) a second position in which the contact surface is spaced from the inner surface of the pipeline;

determining that the speed of the pipeline inspection tool within the pipeline is less than the predetermined speed;

in response to the speed of the pipeline inspection tool being less than the predetermined speed, driving the second actuator in order to move the contact surface into the first position wherein the contact surface is in engagement with the inner surface of the pipeline, the contact surface included on a forwardmost section of the plurality of tethered sections of the pipeline inspection tool;

driving the first actuator coupled to the contact surface when the contact surface is engaged with the inner surface of the pipeline in order to propel the pipeline inspection tool within the pipeline and increase the speed of the pipeline inspection tool within the pipeline;

determining that the speed of the pipeline inspection tool is greater than the predetermined speed; and in response to the speed of the pipeline inspection tool being greater than the predetermined speed, driving the second actuator in order to move the contact surface out of engagement with the inner surface of the pipeline.

11. The method of claim 10 wherein the contact surface is provided on a wheel and wherein driving the actuator causes the wheel to rotate.

12. The method of claim 10 wherein the contact surface is provided on a track of a track mechanism that includes the track and a wheel configured to drive the track, and wherein driving the actuator causes the track to rotate.

13. The method of claim 10 wherein the contact surface is provided by a clamp member configured to be clamped against an inner surface of the pipeline, the clamp member supported by a guide member configured to be moved axially relative to the forwardmost section.

14. The method of claim 13 wherein a clamp member and guide member provide a drive mechanism configured execute a movement sequence with the clamp member and the guide member in order to move the forwardmost section past the problematic feature in the pipeline when the forwardmost section stops unexpectedly in the pipeline because of the problematic feature.

* * * * *